United States Patent
Reimer

(10) Patent No.: US 11,792,192 B2
(45) Date of Patent: Oct. 17, 2023

(54) AUTOMATIC NETWORK CONFIGURATION FOR SECURITY DEVICES

(71) Applicant: The ADT Security Corporation, Boca Raton, FL (US)

(72) Inventor: Mark Reimer, Denver, CO (US)

(73) Assignee: The ADT Security Corporation, Boca Raton, FL (US)

( * ) Notice: Subject to any disclaimer, the term of this patent is extended or adjusted under 35 U.S.C. 154(b) by 151 days.

(21) Appl. No.: 17/390,208

(22) Filed: Jul. 30, 2021

(65) Prior Publication Data

US 2022/0038457 A1 Feb. 3, 2022

Related U.S. Application Data

(60) Provisional application No. 63/059,411, filed on Jul. 31, 2020.

(51) Int. Cl.
*H04W 12/08* (2021.01)
*H04W 12/06* (2021.01)
(Continued)

(52) U.S. Cl.
CPC ...... *H04L 63/0876* (2013.01); *H04L 63/0263* (2013.01)

(58) Field of Classification Search
None
See application file for complete search history.

(56) References Cited

U.S. PATENT DOCUMENTS

| 8,000,344 B1 * | 8/2011 | Frick | H04L 63/162 725/15 |
| 2005/0081058 A1 * | 4/2005 | Chang | H04L 63/0236 726/4 |

(Continued)

FOREIGN PATENT DOCUMENTS

| WO | WO-2009023647 A1 * | 2/2009 | G05B 15/02 |
| WO | 2019084340 A1 | 5/2019 | |

(Continued)

OTHER PUBLICATIONS

Attacks Due to Flaw of Protocols Used In Network Access Control (NAC), Their Solutions and Issues: A Survey. Parhi.MECS. (Year: 2012).*

(Continued)

*Primary Examiner* — Venkat Perungavoor
(74) *Attorney, Agent, or Firm* — Christopher & Weisberg, P.A.

(57) ABSTRACT

A method, node, wireless device and installation device are disclosed. In one or more embodiments, a node configured to operate a security virtual local area network (VLAN) and a customer VLAN independent from the security VLAN is provided. The security VLAN is configured to operate using a first network partition different from a second network partition used by the customer VLAN. The node includes processing circuitry configured to receive information from a first device requesting access to the node, determine whether to add a first device to the security VLAN based at least on the received information from the first device meeting a predefined criterion, and configure the first device to access one of the security VLAN and customer VLAN based at least on the determination.

24 Claims, 6 Drawing Sheets

(51) Int. Cl.
*G06F 21/35* (2013.01)
*H04L 9/40* (2022.01)
*H04W 48/20* (2009.01)
*H04W 48/02* (2009.01)

(56) References Cited

U.S. PATENT DOCUMENTS

| | | | |
|---|---|---|---|
| 2009/0031413 A1* | 1/2009 | Chang | H04L 63/105 726/13 |
| 2009/0067436 A1* | 3/2009 | Gast | H04L 12/4679 370/395.53 |
| 2014/0053281 A1 | 2/2014 | Benoit et al. | |
| 2018/0115901 A1* | 4/2018 | Nenov | H04L 12/2803 |
| 2019/0171249 A1* | 6/2019 | Begley | H04W 84/022 |
| 2019/0310876 A1* | 10/2019 | Nenov | H04L 12/2803 |

FOREIGN PATENT DOCUMENTS

| | | | | |
|---|---|---|---|---|
| WO | WO-2019084340 A1 * | 5/2019 | | H04L 12/4641 |
| WO | WO-2020206453 A1 * | 10/2020 | | G08B 13/19656 |

OTHER PUBLICATIONS

Denial of Service Attack on Low Rate Wireless Personal Area Networks. Matam.IEEE. (Year: 2016).*
Deep Network Security Analysis Smarthome Internet of Things (IoT) Using Cisco Packet Tracer With Metode Square. Laksamana. (Year: 2019).*
International Search Report and Written Opinion dated Oct. 29, 2021, for International Application No. PCT/US2021/043955, International Filing Date; Jul. 30, 2021; consisting of 16 pages.
Wi-fi alliance; Draft Device Provisioning Protocol Specification Version 1.2, pp. 1-174, XP055787796; Mar. 3, 2020 (Mar. 3, 2020); consisting of 174 pages.

* cited by examiner

AUTOMATIC NETWORK CONFIGURATION FOR SECURITY DEVICES

CROSS REFERENCE TO RELATED APPLICATION

The present application claims priority to and the benefit of the filing date of U.S. Provisional Patent Application Ser. No. 63/059,411, filed Jul. 31, 2020, which is incorporated herein by reference in its entirety.

FIELD

The present invention relates to premises systems, and in particular, to automatic security network configuration for security devices in a premises system.

BACKGROUND

Existing consumer Wi-Fi networks are not managed like enterprise networks where network boundaries are used to group devices sharing the same network security requirements, monitoring requirements, and enforcement of ingress and egress firewall rules. Such management of consumer Wi-Fi networks is likely not because consumer networks have no need for enterprise-like network security, it is likely because there exists no easy way for non-technical consumers to set-up, monitor, and manage a secure network for themselves. This results in sensitive communications from trusted devices and untrusted devices, including non-secure Internet of Things products or guest devices, all communicating on the same consumer network or same network resources.

To help address this problem, several companies have seen the need to secure consumer home networks and have created stand-alone products to attempt to fill the security gaps. However, these products do not manage the wireless network, and are required to listen/monitor for and intercept data traffic in order to perform their functions of helping secure the consumer home network. This leads to increased complexity for consumers and a poor user experience. Hence, existing solutions fail to adequately address the issue of securing communications at the consumer side given that the consumer may be a non-technical consumer.

SUMMARY

Some embodiments advantageously provide methods, systems, and apparatuses for automatic security network configuration for security devices in a premises system.

In one or more embodiments, enterprise network partitioning and security is provided that is less complex to use than existing systems, and that may provide self-healing functionality.

In one or more embodiments, a method for creating and managing a secure, independent network for security devices is provided. Security devices may include one or more of internet protocol (IP) cameras, microphones, security alarm panels, touchscreen interfaces, and sensors communicating over IP using WiFi (also referred Wi-Fi) or Ethernet, as part of a security alarm system. These devices are trusted devices that are managed by a service provider who updates firmware with over-the-air security improvements. Upon installing a new security device, the Network Manager (i.e., node) creates a virtual local area network (VLAN), i.e., security VLAN, which establishes a new network partition for the managed security devices. This VLAN may be associated with a new unique SSID, which is independent from the WiFi network SSID managed by the customer, i.e., independent of a consumer VLAN or consumer managed VLAN. Security devices are identified during a device onboarding process, and automatically moved to the security device VLAN and firewall rules, specific to the device, are installed at the node for management of the security device and its associated network traffic, for example. The firewall rules may be provided by the service provider and may define which communications (IP address, port, protocol, etc.) associated with the device are allowed. These rules are added to the list of allowed functionality/communications, i.e., allow-list, managed by the node. All communications not allow-listed may be blocked by default for the security device/security VLAN. As new services are added or removed, updated firewall rules can be provided by the service provider for the system will apply.

By having a separate network partition provided by a security VLAN for security devices, which is independent from the consumer-managed network, one or more of the following benefits can be realized:
 Changes to the Wi-Fi SSID name or PSK (password) to the consumer VLAN do not affect devices on the security network (i.e., security VLAN) even though both consumer VLAN and the security VLAN may be provided by the same node/router.
 The security network can one or more of use stronger encryption, more complex passwords and Simultaneous Authentication of Equals (SAE) which is resistant to offline dictionary attacks, which may hinder non-technical consumers if similar security is implemented in the consumer VLAN.
 Provides defense-in-depth—a compromised device in the consumer's network may not be able to access or sniff communications from devices in the security device network.
 The service provider can install devices into the secure device/security network without needing to know the consumer's Wi-Fi SSID or PSK (password) as the security network may be managed independent of the consumer managed network/VLAN.
 Supports automatic security device onboarding and self-healing with zero touch device onboarding.
 Increases privacy for IP video camera feeds.

According to one aspect of the invention, a node configured to operate a security virtual local area network (VLAN) and a customer VLAN independent from the security VLAN is provided. The security VLAN is configured to operate using a first network partition different from a second network partition used by the customer VLAN. The node includes processing circuitry configured to: receive information from a first device requesting access to the node, determine whether to add a first device to the security VLAN based at least on the received information from the first device meeting a predefined criterion, and configure the first device to access one of the security VLAN and customer VLAN based at least on the determination.

According to one or more embodiments of this aspect, the processing circuitry is further configured to create the security VLAN in response to the received information. According to one or more embodiments of this aspect, the processing circuitry is further configured to: receive security data, from the first device, over the security VLAN, determine that a destination internet protocol and port associated with the security data fails to meet a criterion associated with first device, and reject transmission of the security data in response to the determination that the destination internet protocol and port fail to meet the criterion. According to one or more embodiments of this aspect, the first device is one of a security alarm panel and premises security device, and the node is a wireless router positioned at a premises.

According to one or more embodiments of this aspect, the security VLAN is associated with a first service set identifier (SSID), the customer VLAN is associated with a second SSID different from the first SSID. According to one or more embodiments of this aspect, the processing circuitry is further configured to identify the first device as a premises security device based at least on the received information where the determination to add the first device to the security VLAN is based at least on the identification of the first device. According to one or more embodiments of this aspect, in response to determining to add the first device to the security VLAN, trigger installation of at least one firewall rule associated with the first device, the installation including adding the at least one firewall rule to an allow list, and the processing circuitry is further configured to block communications associated with the security VLAN where the communications fail to meet the at least one firewall rule in the allow list.

According to one or more embodiments of this aspect, the customer VLAN is a consumer-managed VLAN, the security VLAN is a service provider managed VLAN, and the first device is added to the security VLAN without knowledge of a service set identifier (SSID) and cryptographic key associated with the consumer VLAN. According to one or more embodiments of this aspect, the processing circuitry is further configured to initialize the security VLAN in response to determining to add the first device to the security VLAN, the first device is configured to access the security VLAN. According to one or more embodiments of this aspect, the configuring the first device to access the security VLAN includes communicating a network configuration object to the first device where the network configuration object includes at least one of a service set identifier (SSID), pre-shared key (PSK) and network security credentials for accessing the security VLAN.

According to one or more embodiments of this aspect, the processing circuitry is further configured to: monitor at least one network connectivity measure of the security VLAN, indicate that at least one network connectivity measure fails to meet at least one predefined threshold, and receive an indication to change at least one security VLAN parameter where the change of the at least one security VLAN parameter is based at least on the indication that at least one network connectivity measure fails to meet at least one predefined threshold. According to one or more embodiments of this aspect, the node includes a monitoring agent that is configured to monitor at least one network connectivity measure of the security VLAN. The processing circuitry is further configured to: determine the monitoring agent is disconnected from the security VLAN; determine the security VLAN is not detectable; evaluate a respective basic service set identifier (BSSID) value for each network that is detectable; determine whether at least one respective BSSID value of the at least one detectable network equals a BSSID value of the security VLAN; cause transmission of a message, via a cellular communication path, indicating a lost connection if at least one respective BSSID value for at least one network does not equal the BSSID value of the security VLAN; and initiate re-connection to a first detectable network if the first detectable network is associated with a BSSID value that equals the BSSID value of the security VLAN.

According to one or more embodiments of this aspect, the processing circuitry is further configured to: determine the first device is not listed in a preconfigured device list that indicates devices allowed to operate in the security VLAN, and in response to the determination that the first device is not listed in the preconfigured device list, add the first device to the customer VLAN.

According to another aspect of the invention, a method implemented by a node that is configured to operate a security virtual local area network (VLAN) and a customer VLAN independent from the security VLAN is provided. The security VLAN is configured to operate using a first network partition different from a second network partition used by the customer VLAN. Information is received from a first device requesting access to the node. A determination is performed whether to add a first device to the security VLAN based at least on the received information from the first device meeting a predefined criterion. The first device is configured to access one of the security VLAN and customer VLAN based at least on the determination.

According to one or more embodiments of this aspect, the security VLAN is created in response to the received information. According to one or more embodiments of this aspect, security data is received from the first device over the security VLAN. A determination is performed that a destination internet protocol and port associated with the security data fails to meet a criterion associated with first device. Transmission of the security data is rejected in response to the determination that the destination internet protocol and port fail to meet the criterion. According to one or more embodiments of this aspect, the first device is one of a security alarm panel and premises security device and the node is a wireless router positioned at a premises.

According to one or more embodiments of this aspect, the security VLAN is associated with a first service set identifier (SSID) where the customer VLAN is associated with a second SSID different from the first SSID. According to one or more embodiments of this aspect, the first device is identified as a premises security device based at least on the received information where the determination to add the first device to the security VLAN is based at least on the identification of the first device. According to one or more embodiments of this aspect, in response to determining to add the first device to the security VLAN, installation of at least one firewall rule associated with the first device is triggered where the installation includes adding the at least one firewall rule to an allow list. Communications associated with the security VLAN are blocked where the communications fail to meet the at least one firewall rule in the allow list.

According to one or more embodiments of this aspect, the customer VLAN is a consumer-managed VLAN, the security VLAN is a service provider managed VLAN. The first device is added to the security VLAN without knowledge of a service set identifier (SSID) and cryptographic key associated with the consumer VLAN. According to one or more embodiments of this aspect, the security VLAN is initialed in response to determining to add the first device to the security VLAN, the first device is configured to access the security VLAN. According to one or more embodiments of this aspect, the configuring of the first device to access the security VLAN includes communicating a network configuration object to the first device where the network configuration object includes at least one of a service set identifier (SSID), pre-shared key (PSK) and network security credentials for accessing the security VLAN.

According to one or more embodiments of this aspect, monitoring at least one network connectivity measure of the security VLAN is monitored. Indicate that at least one network connectivity measure fails to meet at least one predefined threshold. An indication to change at least one security VLAN parameter is received where the change of the at least one security VLAN parameter is based at least on the indication that at least one network connectivity measure fails to meet at least one predefined threshold. According to one or more embodiments of this aspect, the node includes a monitoring agent configured to monitor at least one network connectivity measure of the security VLAN. A determination is made that the monitoring agent is disconnected from the security VLAN. A determine is made that the security VLAN is not detectable. A respective basic service set identifier (BSSID) value for each network that is detectable is evaluated. A determination is made whether at least one respective BSSID value of the at least one detectable network equals a BSSID value of the security VLAN. Transmission is caused of a message, via a cellular communication path, indicating a lost connection if at least one respective BSSID value for at least one network does not equal the BSSID value of the security VLAN. Re-connection is initiated to a first detectable network if the first detectable network is associated with a BSSID value that equals the BSSID value of the security VLAN.

According to one or more embodiments of this aspect, a determination is made that the first device is not listed in a preconfigured device list that indicates devices allowed to operate in the security VLAN. In response to the determination that the first device is not listed in the preconfigured device list, the first device is added to the customer VLAN.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
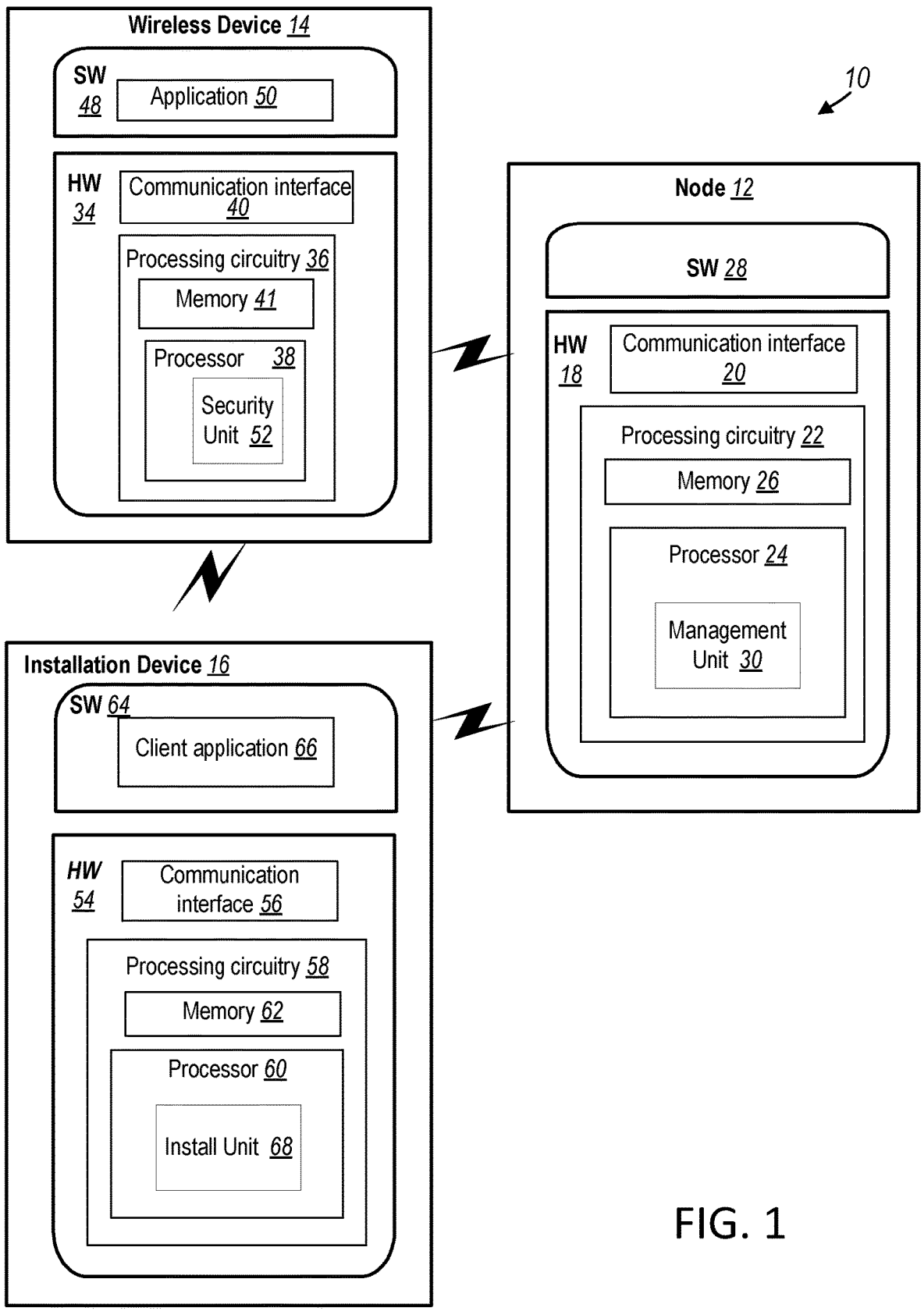
FIG. 1 is a block diagram of various devices and components according to some embodiments of the present invention.

Before describing in detail example embodiments, it is noted that the embodiments reside primarily in combinations of apparatus components and processing steps related to automatic security network configuration for security devices in a premises system. Accordingly, components have been represented where appropriate by conventional symbols in the drawings, showing only those specific details that are pertinent to understanding the embodiments so as not to obscure the invention with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "node" used herein can be any kind of network node comprised in a radio network which may further comprise any of base station (BS), radio base station, base transceiver station (BTS), router, etc.

In some embodiments, the wireless device (also referred to as device) herein can be any type of wireless device capable of communicating with the node or another wireless device over radio signals, such as wireless device. The wireless device may also be a sensor equipped with a wireless device, Tablet, smart phone, USB dongles, Customer Premises Equipment (CPE), an Internet of Things (IoT) device, premises security device with wireless capability (e.g., security alarm panel, camera, sensor(s), etc.), etc.

Note that although terminology from one particular wireless system, such as, for example, Wi-Fi, may be used in this invention, this should not be seen as limiting the scope of the invention to only the aforementioned system. Other wireless systems may also benefit from exploiting the ideas covered within this invention.

Note further, that functions described herein as being performed by the node may be distributed over a plurality of nodes or devices. In other words, it is contemplated that the functions of the node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide automatic security network configuration for security devices in a premises system.

Referring now to the drawing figures, in which like elements are referred to by like reference numerals, there is shown in FIG. 1 a block diagram of several entities in a communication system 10. System 10 may be part of a premises security system 10 where node 12 and wireless device 14 (also referred to as device 14) may be located at a premises such as a consumer's premises. In one or more embodiments, node 12, wireless device 14 and installation device 16 may be configured to communicate with each other via one or more communication protocols.

In particular, node 12 may be a network router such as a wireless network router that is configured to provide the functions described herein. Node 12 may include hardware 18 enabling it to communicate with wireless device 14 and installation device 16. The hardware 18 may include a communication interface 20 for setting up and maintaining a wired or wireless connection with an interface of a different communication device such as wireless device 14 of the communication system 10. Communication interface 20 may include a radio interface for setting up and maintaining at least a wireless connection with wireless device 14 and/or installation device 16 located in a coverage area served by node 12. The radio interface may be formed as or may include, for example, one or more RF transmitters, one or more RF receivers, and/or one or more RF transceivers.

In the embodiment shown, the hardware 18 of the node 12 further includes processing circuitry 22. The processing circuitry 22 may include a processor 24 and a memory 26. In particular, in addition to or instead of a processor, such as a central processing unit, and memory, the processing circuitry 22 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 24 may be configured to access (e.g., write to and/or read from) the memory 26, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the node 12 further has software 28 stored internally in, for example, memory 26, or stored in external memory (e.g., database, storage array, network storage device, etc.) accessible by node 12 via an external connection. The software 28 may be executable by the processing circuitry 22. The processing circuitry 22 may be configured to control any of the methods and/or processes described herein and/or to cause such methods, and/or processes to be performed, e.g., by node 12. Processor 24 corresponds to one or more processors 24 for performing node 12 functions described herein. The memory 26 is configured to store data, programmatic software code and/or other information described herein. In some embodiments, the software 28 may include instructions that, when executed by the processor 24 and/or processing circuitry 22, causes the processor 24 and/or processing circuitry 22 to perform the processes described herein with respect to node 12. For example, processing circuitry 22 of the node 12 may include management unit 30 configured to perform one or more node 12 functions as described herein such as with respect to automatic security network configuration for security devices in a premises system. In one or more embodiments, software 28 may include a network monitoring agent as described herein.

The communication system 10 further includes the wireless device 14 already referred to. The wireless device 14 may have hardware 34 that may include a communication interface 40, which may include a radio interface, configured to set up and maintain a wireless connection with a node 12. The radio interface may be formed as or may include, for example, one or more RF transmitters, one or more RF receivers, and/or one or more RF transceivers.

The hardware 34 of the wireless device 14 further includes processing circuitry 36. The processing circuitry 36 may include a processor 38 and memory 41. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) memory 41, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 14 may further comprise software 48, which is stored in, for example, memory 41 at the wireless device 14, or stored in external memory (e.g., database, storage array, network storage device, etc.) accessible by the wireless device 14. The software 48 may be executable by the processing circuitry 36. The processing circuitry 36 may be configured to control any of the methods and/or processes described herein and/or to cause such methods, and/or processes to be performed, e.g., by wireless device 14. The processor 38 corresponds to one or more processors 38 for performing wireless device 14 functions described herein. The wireless device 14 includes memory 41 that is configured to store data, programmatic software code and/or other information described herein. In some embodiments, the software 48 and/or the application 50 may include instructions that, when executed by the processor 38 and/or processing circuitry 36, causes the processor 38 and/or processing circuitry 36 to perform the processes described herein with respect to wireless device 14. For example, the processing circuitry 36 of the wireless device 14 may include security unit 52 configured to perform one or more wireless device 14 functions as described herein such as with respect to automatic security network configuration for security devices in a premises system.

The communication system 10 further includes the installation device 16 already referred to. The installation device 16 may have hardware 54 that may include a communication interface 56, which may include a radio interface, configured to set up and maintain a wireless connection with a node 12 and/or wireless device 14. The radio interface may be formed as or may include, for example, one or more RF transmitters, one or more RF receivers, and/or one or more RF transceivers.

The hardware 54 of installation device 16 further includes processing circuitry 58. The processing circuitry 58 may include a processor 60 and memory 62. In particular, in addition to or instead of a processor, such as a central processing unit, and memory, the processing circuitry 58 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 60 may be configured to access (e.g., write to and/or read from) memory 62, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the installation device 16 may further comprise software 64, which is stored in, for example, memory 62 at installation device 16, or stored in external memory (e.g., database, storage array, network storage device, etc.) accessible by installation device 16. The software 64 may be executable by the processing circuitry 58. The software 64 may include client application 66. The client application 66 may be operable to provide a service to a human or non-human user via installation device 16. The client application 66 may interact with the user to generate the user data that it provides.

The processing circuitry 58 may be configured to control any of the methods and/or processes described herein and/or to cause such methods, and/or processes to be performed, e.g., by installation device 16. The processor 60 corresponds to one or more processors 60 for performing installation device 16 functions described herein. The installation device 16 includes memory 62 that is configured to store data, programmatic software code and/or other information described herein. In some embodiments, the software 64 and/or the client application 66 may include instructions that, when executed by the processor 60 and/or processing circuitry 58, causes the processor 60 and/or processing circuitry 58 to perform the processes described herein with respect to installation device 16. For example, the processing circuitry 58 of installation device 16 may include an install unit 68 configured to perform one or more installation device 16 functions as described herein such as with respect to automatic security network configuration for security devices in a premises system.

Although FIG. 1 shows various "units" such as management unit 32, security unit 52 and install unit 68, as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 2:
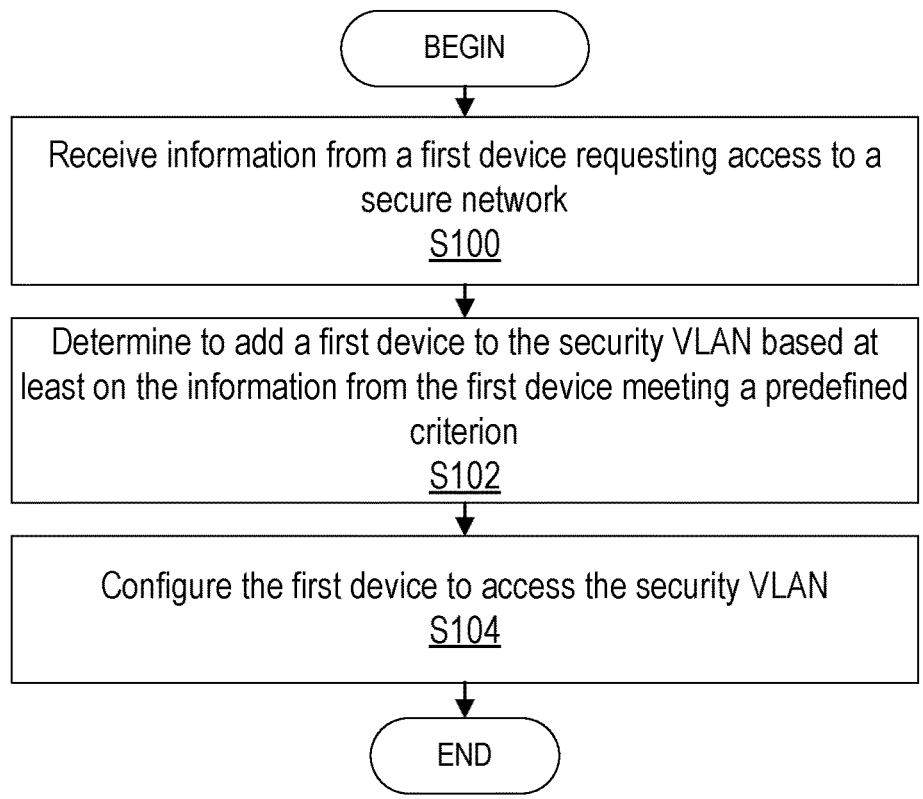
FIG. 2 is a flowchart of an example process in a node according to some embodiments of the present invention.

FIG. 2 is a flowchart of an example process in a node 12 according to some embodiments of the invention. One or more blocks described herein may be performed by one or more elements of node 12 such as by one or more of processing circuitry 22 (including the management unit 30), processor 24 and/or communication interface 20. Node 12 is configured to receive (Block S100) information from a first device 14 requesting access to a secure network, as described herein. Node 12 is configured to determine (Block S102) to add a first device 14 to the security VLAN based at least on the information from the first device 14 meeting a predefined criterion, as described herein. Node 12 is configured to configure (Block S104) the first device 14 to access the security VLAN, as described herein.

According to one or more embodiments, the processing circuitry 22 is further configured to create the security VLAN in response to information received from the first device 14. According to one or more embodiments, the processing circuitry 22 is configured to: receive security data, from the first device, over the security VLAN; determine a destination internet protocol and port associated with security data fails to meet a criterion associated with first device 14; and reject transmission of the security data in response to the determination that the destination internet protocol and port fail to meet the criterion.

Figure 3:
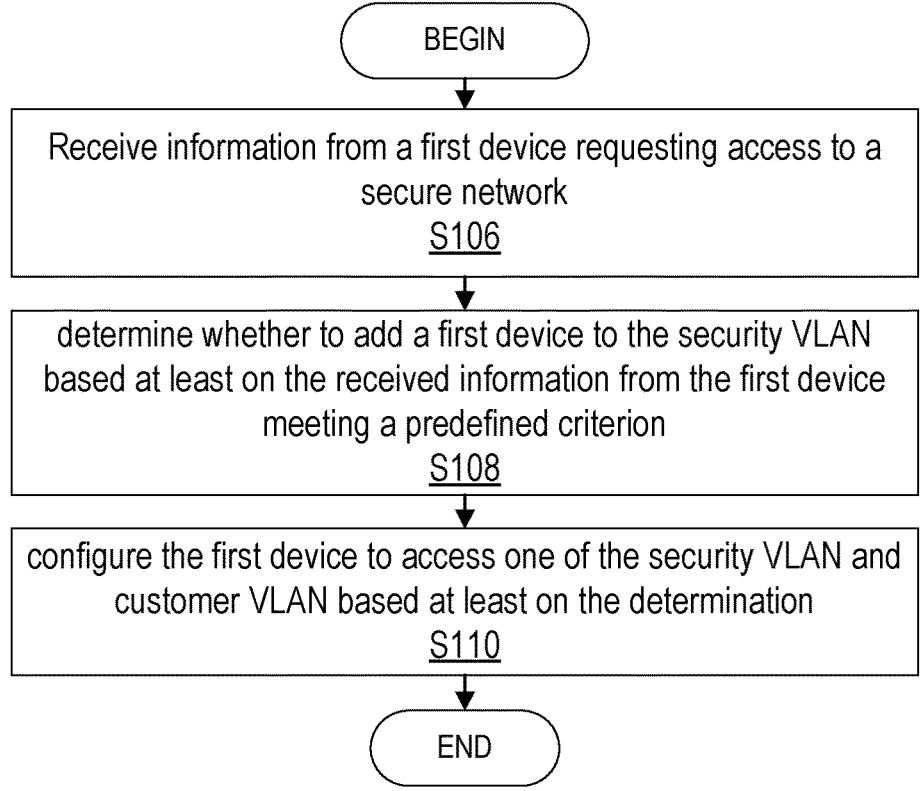
FIG. 3 is a flowchart of another example process in a node according to some embodiments of the present invention.

FIG. 3 is a flowchart of another example process in a node 12 according to some embodiments of the invention. One or more blocks described herein may be performed by one or more elements of node 12 such as by one or more of processing circuitry 22 (including the management unit 30), processor 24 and/or communication interface 20. Node 12 is configured to receive (Block S106) information from a first device requesting access to the node 12, as described herein. Node 12 is configured to determine (Block S108) whether to add a first device 14 to the security VLAN based at least on the received information from the first device 14 meeting a predefined criterion, as described herein. Node 12 is configured to configure (Block S110) the first device 14 to access one of the security VLAN and customer VLAN based at least on the determination, as described herein.

According to one or more embodiments, the processing circuitry 22 is further configured to create the security VLAN in response to the received information. According to one or more embodiments, the processing circuitry 22 is further configured to: receive security data, from the first device 14, over the security VLAN, determine that a destination internet protocol and port associated with the security data fails to meet a criterion associated with first device 14, and reject transmission of the security data in response to the determination that the destination internet protocol and port fail to meet the criterion. According to one or more embodiments, the first device 14 is one of a security alarm panel and premises security device, and the node 12 is a wireless router positioned at a premises.

According to one or more embodiments, the security VLAN is associated with a first service set identifier (SSID), the customer VLAN is associated with a second SSID different from the first S SID. According to one or more embodiments, the processing circuitry 22 is further configured to identify the first device 14 as a premises security device based at least on the received information where the determination to add the first device 14 to the security VLAN is based at least on the identification of the first device 14. According to one or more embodiments, in response to determining to add the first device 14 to the security VLAN, trigger installation of at least one firewall rule associated with the first device 14 where the installation includes adding the at least one firewall rule to an allow list, and the processing circuitry 22 is further configured to block communications associated with the security VLAN where the communications fail to meet the at least one firewall rule in the allow list.

According to one or more embodiments, the customer VLAN is a consumer-managed VLAN, the security VLAN is a service provider managed VLAN, and the first device is added to the security VLAN without knowledge of a service set identifier (SSID) and cryptographic key associated with the consumer VLAN. According to one or more embodiments, the processing circuitry 22 is further configured to initialize the security VLAN in response to determining to add the first device 14 to the security VLAN, the first device 14 is configured to access the security VLAN. According to one or more embodiments, the configuring of the first device 14 to access the security VLAN includes communicating a network configuration object to the first device 14 where the network configuration object includes at least one of a service set identifier (SSID), pre-shared key (PSK) and network security credentials for accessing the security VLAN.

According to one or more embodiments, the processing circuitry 22 is further configured to: monitor at least one network connectivity measure of the security VLAN, indicate that at least one network connectivity measure fails to meet at least one predefined threshold, and receive an indication to change at least one security VLAN parameter where the change of the at least one security VLAN parameter is based at least on the indication that at least one network connectivity measure fails to meet at least one predefined threshold. According to one or more embodiments, the node includes a monitoring agent that is configured to monitor at least one network connectivity measure of the security VLAN. The processing circuitry 22 is further configured to: determine the monitoring agent is disconnected from the security VLAN; determine the security VLAN is not detectable; evaluate a respective basic service set identifier (BSSID) value for each network that is detectable; determine whether at least one respective BSSID value of the at least one detectable network equals a BSSID value of the security VLAN; cause transmission of a message, via a cellular communication path, indicating a lost connection if at least one respective BSSID value for at least one network does not equal the BSSID value of the security VLAN; and initiate re-connection to a first detectable network if the first detectable network is associated with a BSSID value that equals the BSSID value of the security VLAN. According to one or more embodiments, the processing circuitry 22 is further configured to: determine the first device 14 is not listed in a preconfigured device list that indicates devices allowed to operate in the security VLAN, and in response to the determination that the first device 14 is not listed in the preconfigured device list, add the first device 14 to the customer VLAN.

Figure 4:
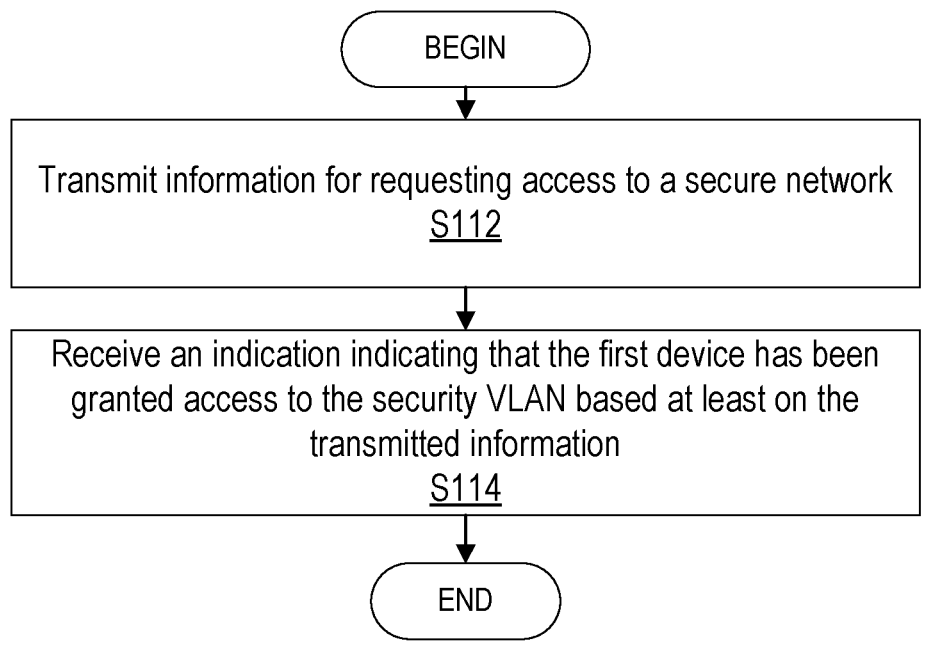
FIG. 4 is a flowchart of an example process in an installation device according to some embodiments of the present invention.

FIG. 4 is a flowchart of an example process in a wireless device 14 according to some embodiments of the invention. One or more blocks described herein may be performed by one or more elements of wireless device 14 such as by one or more of processing circuitry 36 (including the security unit 52), processor 38 and/or communication interface 40. Wireless device 14 is configured to transmit (Block S112) information for requesting access to a secure network, as described herein. Wireless device 14 is configured to receive (Block S114) an indication indicating that the first device, i.e., wireless device 14, has been granted access to the security VLAN based at least on the transmitted information, as described herein.

Figure 5:
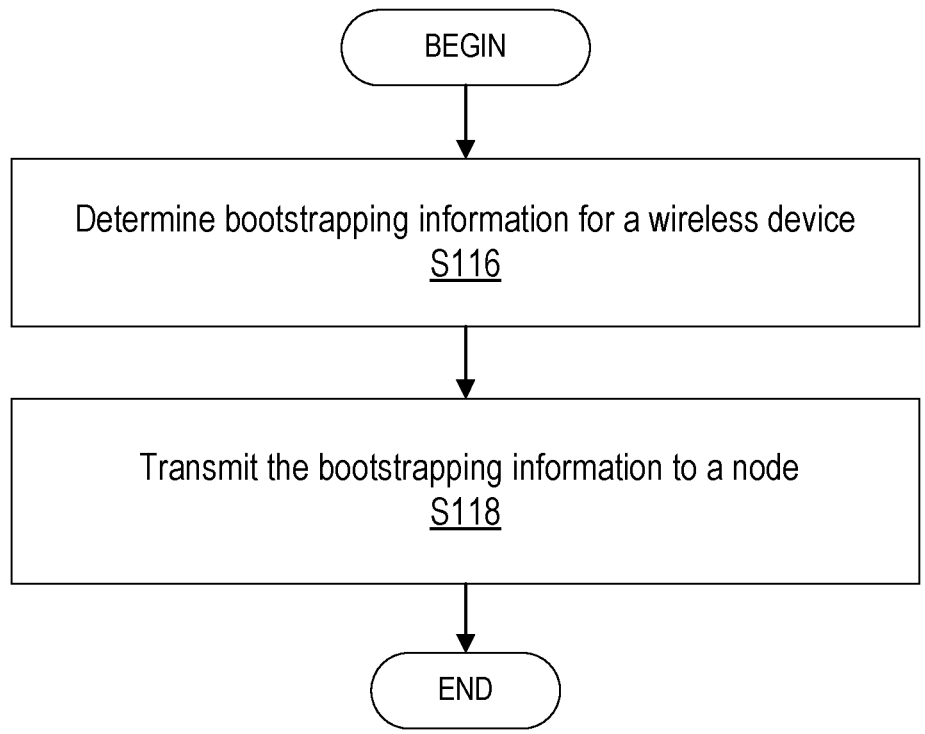
FIG. 5 is a flowchart of an example process in a device according to some embodiments of the present invention.

FIG. 5 is a flowchart of an example process in an installation device 16 according to some embodiments of the invention. One or more blocks described herein may be performed by one or more elements of installation device 16 such as by one or more of processing circuitry 58 (including the install unit 68), processor 60 and/or communication interface 56. Installation device 16 is configured to determine (Block S116) bootstrapping information for a wireless device 14, as described herein. Installation device 16 is configured to transmit (Block S118) the bootstrapping information to a node 12, as described herein.

Having generally described arrangements for automatic security network configuration for security devices in a premises system, details for these arrangements, functions and processes are provided as follows, and which may be implemented by one or more of node 12, wireless device 14 and installation device 16. One or more node 12 functions described below may be performed by one or more of processing circuitry 22, processor 24, management unit 30, etc. One or more wireless device 14 (e.g., device 14) functions described below may be performed by one or more of processing circuitry 36, processor 38, security unit 52, etc. One or more installation device 16 functions described below may be performed by one or more of install unit 68, processing circuitry 58, processor 60, etc.

Figure 6:
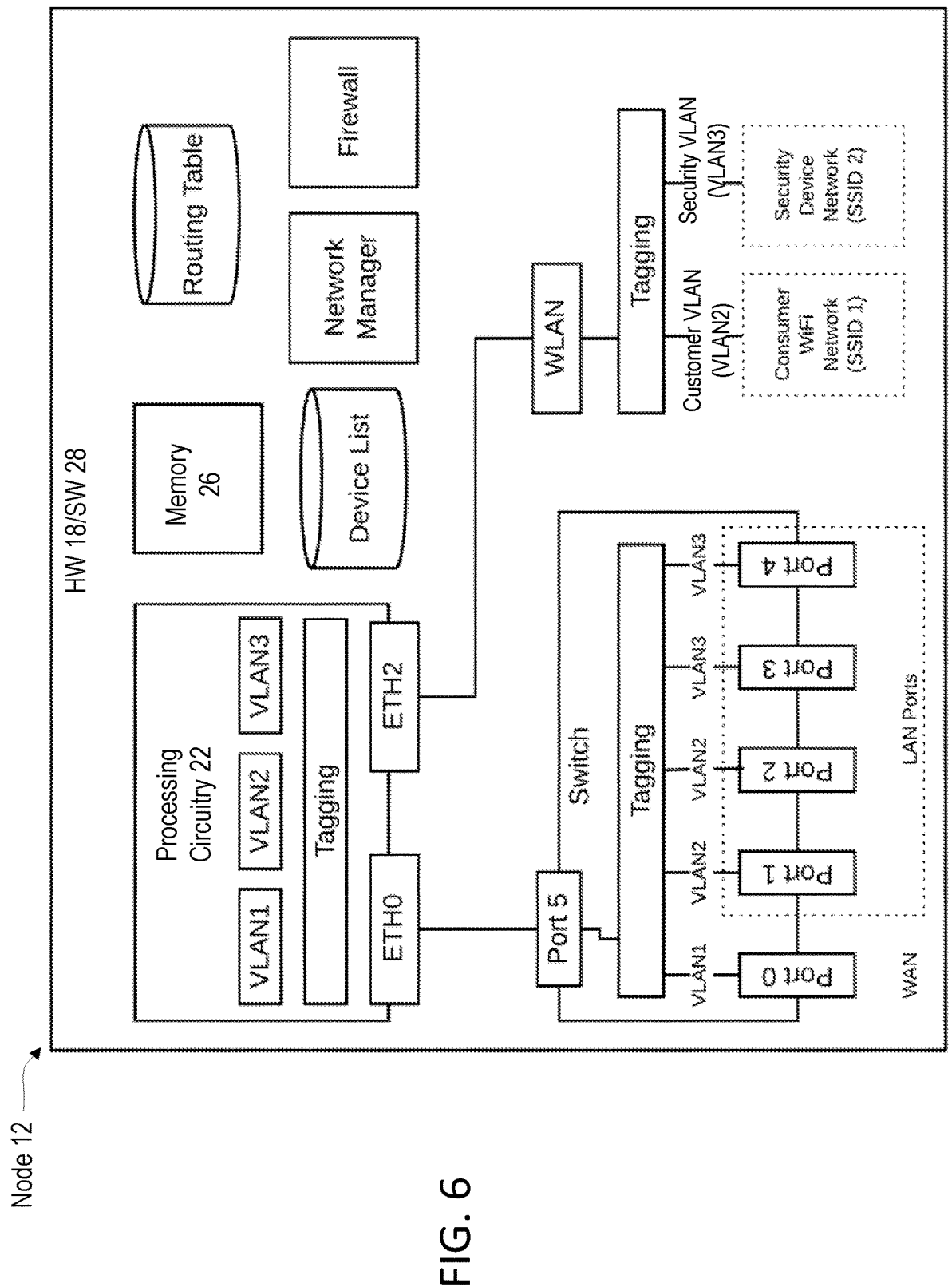
FIG. 6 is a block diagram of components of a node according to some embodiments of the present invention.

Some embodiments provide automatic security network configuration for security devices in a premises system. FIG. 6 is a block diagram of example components/devices for node 12. The system adds new functionality existing router functionality physical hardware and routing software. In particular, FIG. 6 includes both physical (i.e., HW 18) and logical (i.e., SW 28) components/features.

One or more embodiments of the invention relate to at least two additional software components in the node 12 that are configured to create and manage the security device network:

Network Manager—Software component of node 12 that one or more of manages the creation of the security device VLAN (also referred to as security VLAN), updates the routing table, manages firewall rules, and provisions devices using Wi-Fi Certified Easy Connect Device Provisioning Protocol (DPP), for example.

Device List—The device list is a file or database at node 12 that lists the device identifiers and firewall rules for all devices 14 that are allowed to join the security device network.

Figure 7:
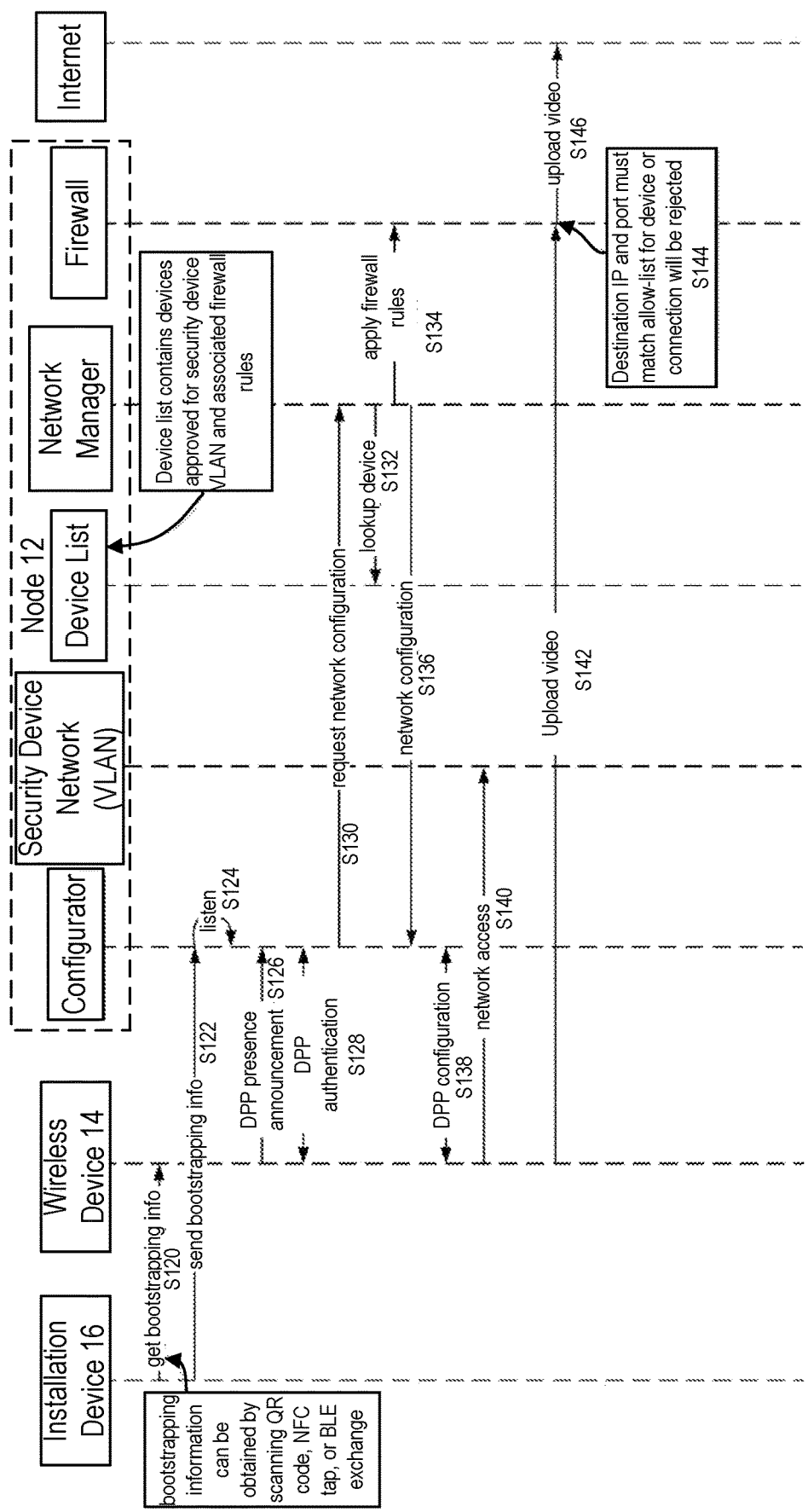
FIG. 7 is an onboarding sequence diagram according to some embodiments of the invention.

An example sequence for onboarding/adding a new wireless device 14 to the Security Device Network is illustrated in FIG. 7. While one or more components are shown as being part of node 12, one or more of these components may separate from node 12 and/or provided by another entity in system 10. The various steps of FIG. 7 are discussed below.

1. The person installing the security device (i.e., type of wireless device 14), in this example, a security camera, uses an installation client application (mobile app or web application) on an installation device 16 where installation device 16 is configured to retrieve the bootstrapping information such as from wireless device 14 where the bootstrapping information contains one or more of the bootstrapping public key, detailed device information and channel information (S120). The bootstrapping information may be defined as part of the Device Provisioning Protocol Specification that is defined by the Wi-Fi Alliance (an organization). The bootstrapping information can be retrieved by scanning a Quick Response (QR) code on the wireless device 14, a NFC tap associated with the wireless device 14, or by Bluetooth associated with the wireless device 14.

2. The bootstrapping information may be sent such as by installation device 16 to the Configurator to start listening on the channel specified by the security camera (S122-S124).

3. Security camera, i.e., an example of a wireless device 14, sends a presence announcement on the specified channel (S126).

4. The Configurator of node 12 may start the DPP authentication handshake (S128).

5. Following successful authentication, Configurator of node 12 may request network configuration information from the Network Manager of node 12 providing the detailed device information (S130).

6. The Network Manager of node 12 may look up the device in the device list to verify whether the wireless device 14 is allowed to join the Security Device Network and retrieve the firewall rules for this device (S132). In one or more embodiments, the wireless device 14 being on the device list may be an example of a predefined criterion being met. The device information provided during bootstrapping may be in a standardized format with information populated by the manufacturer of the device. Devices that are not in the Device List may not be onboarded to the Security Device Network VLAN, but can be onboarded to the Customer VLAN.

7. If this is the first time a wireless device 14 is added to a Security Device Network, the Network Manager of node 12 may create a new security device network VLAN, SSID, and PSK or network security credentials.

8. The Network Manager of node 12 may apply the firewall rules to the Firewall (S134).

9. After creating the VLAN, if this is the first wireless device 14 joining the Security Device Network, and applying firewall rules for the wireless device 14, the network configuration object may be created and provided to the Configurator (S136).

10. The Configurator of node 12 may pass the network configuration object to the Security Camera, i.e., a type of wireless device 14 (S138).

11. The Security Camera (e.g., device 14 or wireless device 14) may use the network configuration including SSID and PSK or network security credentials to join/access the Security Device Network VLAN (S140).

12. After joining the network, the security camera (e.g., wireless device 14) may attempt to upload video to a server such as a server at a central monitoring center (not shown) or camera cloud storage server over the Internet (S142). Connections to destination IP addresses or ports that are in the allow list will be allowed (S144-S146). All other connections will be rejected (S144).

13. From time to time, the Network Management Server (not shown) can provide new or updated devices and/or firewall rules to update the Device List database on node 12. When new firewall rules are provided, they may be implemented automatically.

Self-Healing Capabilities

Because the wireless devices 14 joining the Security Device Network were onboarded using the Device Provisioning Protocol, they are known wireless devices 14, i.e., trusted devices 14. During DPP configuration, the wireless device 14 is provided a Connector that may be used to establish a security association between the enrolling wireless device 14 and the Network Access Point of node 12. This allows the wireless device 14 to be able to re-connect and re-establish network access if the SSID or PSK/Passphrase change.

In another example, the security alarm base station (e.g., node 12) may employ an algorithm to proactively repair lost network connectivity for any device 14 on the Security Device Network VLAN or the Security Device Network VLAN itself. The process is as follows:

1. Network Monitoring Agent (executing in the node 12) proactively monitors one or more of the following network connectivity statistics: 1) signal strength, 2) SNR, 3) upstream bandwidth, 4) downstream bandwidth, 5) availability of ports it uses to connect to the security monitoring servers, 6) WiFi network band in use, 7) WiFi channel in use, and 8) overall network connectivity, and/or other network connectivity statistic.

2. Changes in one or more values of one or more network connectivity statistics are recorded.

3. When at least one fall below at least one pre-configured threshold for at least one per-configured amount of time, the Network Monitoring Agent is configured to transmit a message to the Security Monitoring Service in the cloud. The message may include data such as network connectivity statistics.

4. The Security Monitoring Service in the cloud uses data from the Network Monitoring Agent to optimize the Security Device network VLAN and proactively makes changes—e.g., change the WiFi channel, steer the Security Alarm Base Station (e.g., node 12) to a different WiFi band, and/or steer the Security Alarm Base Station to a different Access Point having a better connection where a "better connection" may correspond to higher throughput, higher SINR, RSRP, etc.

5. If the Network Monitoring Agent is completely disconnected from the Security Device Network VLAN, the following steps are automatically performed to automatically reconnect:
   a. Perform a wireless scan to search for the Security Device Network VLAN. If the network is present or found in the scan, the connecting steps described above such as in FIG. 2-3 are performed.
   b. If the network is no longer present or not found in the scan, evaluate the basic service set identifier (BSSID) values for each network in the wireless scan to determine if there is a network that has the same BSSID value as the BSSID for the Security Device Network.
   c. If a network having the same BSSID is found, the connecting steps described above such as in FIG. 2-3 are performed.
   d. If no network having the same BSSID is found/discovered, transmit a "lost connection" message over a backup cellular communication signal path to the Security Monitoring Service in the cloud.
   e. The Security Monitoring Service may push a notification to a user/customer application such as a user's interactive security mobile app, that the Security Device Network is no longer available.

This feature may help solve one of the most common customer support requests, namely, to help get a wireless device 14 back on the wireless network. With the teachings described herein, wireless devices 14 help themselves get back on the network automatically after the SSID or PSK/Passphrase has changed—without any user/consumer intervention.

Figure 8:
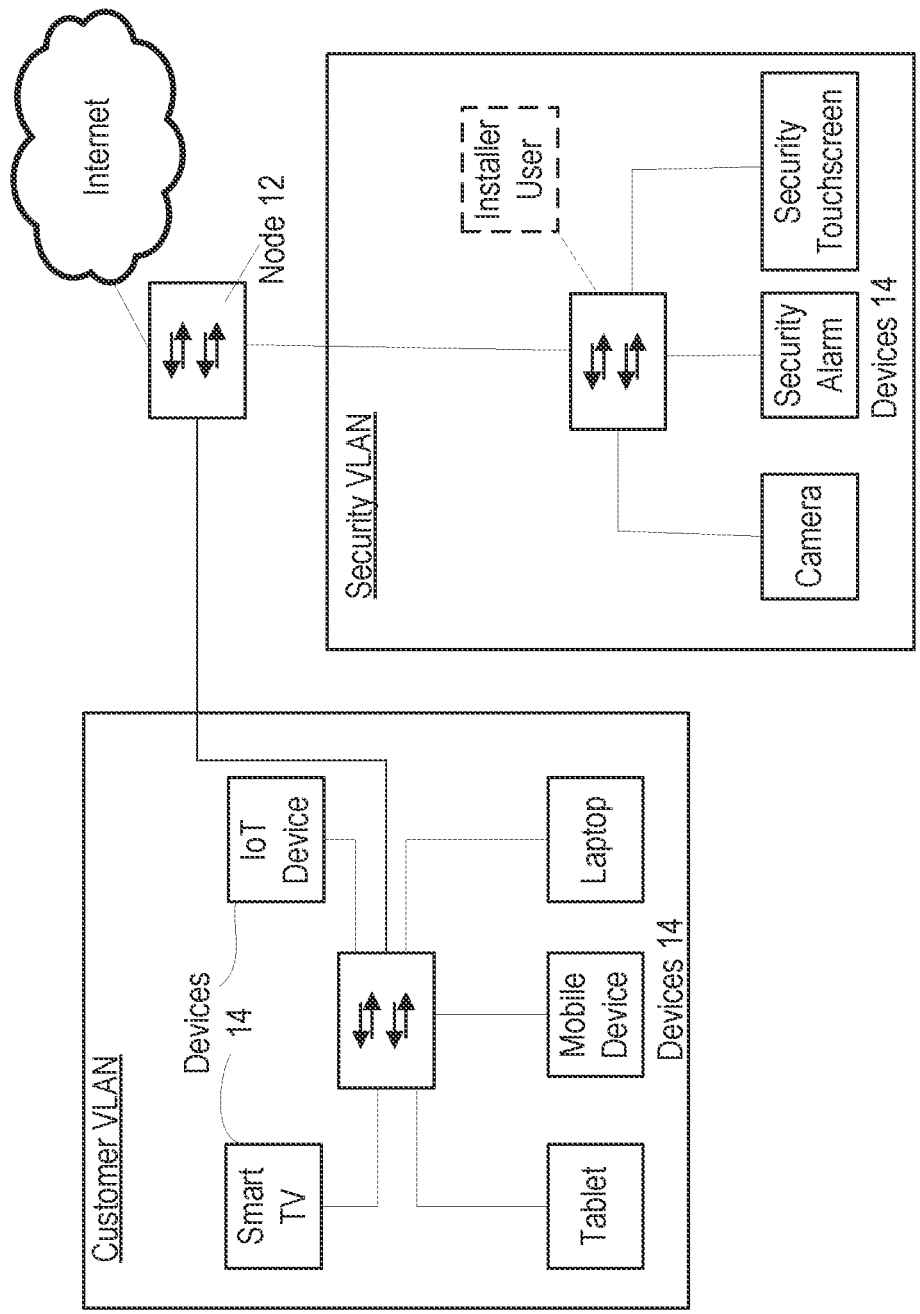
FIG. 8 is a block diagram of customer and security device network partitions according to some embodiments of the invention.

FIG. 8 is a block diagram of an example of customer and security device network partitions according to some embodiments of the invention. An example routing rule for the customer VLAN includes unrestricted access to internet and to other devices on the same network (VLAN2). Example routing rules for the security VLAN includes one or more of: only allow connections on approved allow-list, block all connections not on approved whitelist, allow device provisional protocol to/from VLAN2, and installer will have conditional access for device onboarding.

EXAMPLES

Example A1. A node 12 configured to operate a security VLAN and a customer VLAN independent from the security VLAN, the security VLAN configured to operate using a first network partition different from a second network partition used by the customer VLAN, the node 12 comprising processing circuitry 22 configured to:

receive information from a first device 14 requesting access to a secure network;

determine to add a first device 14 to the security VLAN based at least on the information from the first device 14 meeting a predefined criterion; and configure the first device 14 to access the security VLAN.

Example A2. The node 12 of Example A1, wherein the processing circuitry 22 is further configured to create the security VLAN in response to information received from the first device 14.

Example A3. The node 12 of Example A1, wherein the processing circuitry 22 is configured to:

receive security data, from the first device 14, over the security VLAN;

determine a destination internet protocol and port associated with security data fails to meet a criterion associated with first device 14; and reject transmission of the security data in response to the determination that the destination internet protocol and port fail to meet the criterion.

Example B1. A method implemented by a node 12 configured to operate a security VLAN and a customer VLAN independent from the security VLAN, the security VLAN configured to operate using a first network partition different from a second network partition used by the customer VLAN, the method comprising:

receiving information from a first device 14 requesting access to a secure network;

determining to add a first device 14 to the security VLAN based at least on the information from the first device 14 meeting a predefined criterion; and configuring the first device 14 to access the security VLAN.

Example B2. The method of Example B 1, further comprising creating the security VLAN in response to information received from the first device 14.

Example B3. The method of Example B 1, further comprising:

receiving security data, from the first device 14, over the security VLAN; determining a destination internet protocol and port associated with security data fails to meet a criterion associated with first device 14; and rejecting transmission of the security data in response to the determination that the destination internet protocol and port fail to meet the criterion.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the invention may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A node configured to operate a security virtual local area network (VLAN) and a customer VLAN independent from the security VLAN, the security VLAN configured to operate using a first network partition different from a second network partition used by the customer VLAN, the node comprising:
   a monitoring agent configured to monitor at least one network connectivity measure of the security VLAN;
   a processor; and
   a memory storing instructions that, when executed, cause the processor to:
      receive information from a first device requesting access to the node;
      determine whether to add the first device to the security VLAN based at least on the received information from the first device meeting a predefined criterion;
      configure the first device to access the security VLAN or the customer VLAN based at least on the determination of whether to add the first device to the security VLAN;
      determine the monitoring agent is disconnected from the security VLAN;
      determine the security VLAN is not detectable;
      evaluate a respective basic service set identifier (BSSID) value for each network that is detectable;
      determine whether at least one respective BSSID value of the at least one detectable network equals a BSSID value of the security VLAN;
      cause transmission of a message, via a cellular communication path, indicating a lost connection if at least one respective BSSID value for at least one network does not equal the BSSID value of the security VLAN; and
      initiate re-connection to a first detectable network if the first detectable network is associated with a BSSID value that equals the BSSID value of the security VLAN.

2. The node of claim 1, wherein the memory stores instructions that, when executed, further cause the processor to create the security VLAN in response to the received information.

3. The node of claim 1, wherein the memory stores instructions that, when executed, further cause the processor to:
   receive security data, from the first device, over the security VLAN;
   determine that a destination internet protocol and port associated with the security data fails to meet a criterion associated with the first device; and
   reject transmission of the security data in response to the determination that the destination internet protocol and port fail to meet the criterion.

4. The node of claim 1, wherein the first device is one of a security alarm panel and premises security device; and
   the node is a wireless router positioned at a premises.

5. The node of claim 1, wherein the security VLAN is associated with a first service set identifier (SSID), the customer VLAN is associated with a second SSID different from the first SSID.

6. The node of claim 1, wherein the memory stores instructions that, when executed, further cause the processor to identify the first device as a premises security device based at least on the received information, the determination to add the first device to the security VLAN being based at least on the identification of the first device.

7. The node of claim 1, wherein, in response to determining to add the first device to the security VLAN, trigger installation of at least one firewall rule associated with the first device, the installation including adding the at least one firewall rule to an allow list; and
   the memory stores instructions that, when executed, further cause the processor to block communications associated with the security VLAN where the communications fail to meet the at least one firewall rule in the allow list.

8. The node of claim 1, wherein the customer VLAN is a consumer-managed VLAN, the security VLAN is a service provider managed VLAN; and
   the first device is added to the security VLAN without knowledge of a service set identifier (SSID) and cryptographic key associated with the consumer VLAN.

9. The node of claim 1, wherein the memory stores instructions that, when executed, further cause the processor to initialize the security VLAN in response to determining to add the first device to the security VLAN, the first device is configured to access the security VLAN.

10. The node of claim 1, wherein the configuring of the first device to access the security VLAN includes communicating a network configuration object to the first device, the network configuration object including at least one of a service set identifier (SSID), pre-shared key (PSK) and network security credentials for accessing the security VLAN.

11. The node of claim 1, wherein the memory stores instructions that, when executed, further cause the processor to:
    monitor at least one network connectivity measure of the security VLAN;
    indicate that at least one network connectivity measure fails to meet at least one predefined threshold; and
    receive an indication to change at least one security VLAN parameter, the change of the at least one security VLAN parameter being based at least on the indication that at least one network connectivity measure fails to meet at least one predefined threshold.

12. The node of claim 1, wherein the memory stores instructions that, when executed, further cause the processor to:
    determine the first device is not listed in a preconfigured device list that indicates devices allowed to operate in the security VLAN; and
    in response to the determination that the first device is not listed in the preconfigured device list, add the first device to the customer VLAN.

13. A method implemented by a node that is configured to operate a security virtual local area network (VLAN) and a customer VLAN independent from the security VLAN, the security VLAN configured to operate using a first network partition different from a second network partition used by the customer VLAN, the node comprising a monitoring agent configured to monitor at least one network connectivity measure of the security VLAN, the method comprising:
    receiving information from a first device requesting access to the node;
    determining whether to add the first device to the security VLAN based at least on the received information from the first device meeting a predefined criterion;

configuring the first device to access the security VLAN or the customer VLAN based at least on the determination of whether to add the first device to the security VLAN;

determining the monitoring agent is disconnected from the security VLAN;

determining the security VLAN is not detectable;

evaluating a respective basic service set identifier (BSSID) value for each network that is detectable;

determining whether at least one respective BSSID value of the at least one detectable network equals a BSSID value of the security VLAN;

causing transmission of a message, via a cellular communication path, indicating a lost connection if at least one respective BSSID value for at least one network does not equal the BSSID value of the security VLAN; and initiate re-connection to a first detectable network if the first detectable network is associated with a BSSID value that equals the BSSID value of the security VLAN.

14. The method of claim 13, further comprising creating the security VLAN in response to the received information.

15. The method of claim 13, further comprising:

receiving security data, from the first device, over the security VLAN;

determining that a destination internet protocol and port associated with the security data fails to meet a criterion associated with the first device; and rejecting transmission of the security data in response to the determination that the destination internet protocol and port fail to meet the criterion.

16. The method of claim 13, wherein the first device is one of a security alarm panel and premises security device; and the node is a wireless router positioned at a premises.

17. The method of claim 13, wherein the security VLAN is associated with a first service set identifier (SSID), the customer VLAN is associated with a second SSID different from the first SSID.

18. The method of claim 13, further comprising identifying the first device as a premises security device based at least on the received information, the determination to add the first device to the security VLAN being based at least on the identification of the first device.

19. The method of claim 13, wherein, in response to determining to add the first device to the security VLAN, trigger installation of at least one firewall rule associated with the first device, the installation including adding the at least one firewall rule to an allow list; and the method further includes blocking communications associated with the security VLAN where the communications fail to meet the at least one firewall rule in the allow list.

20. The method of claim 13, wherein the customer VLAN is a consumer-managed VLAN, the security VLAN is a service provider managed VLAN; and the first device is added to the security VLAN without knowledge of a service set identifier (SSID) and cryptographic key associated with the consumer VLAN.

21. The method of claim 13, further comprising initializing the security VLAN in response to determining to add the first device to the security VLAN, the first device is configured to access the security VLAN.

22. The method of claim 13, wherein the configuring of the first device to access the security VLAN includes communicating a network configuration object to the first device, the network configuration object including at least one of a service set identifier (SSID), pre-shared key (PSK) and network security credentials for accessing the security VLAN.

23. The method of claim 13, further comprising:

monitoring at least one network connectivity measure of the security VLAN;

indicating that at least one network connectivity measure fails to meet at least one predefined threshold; and receiving an indication to change at least one security VLAN parameter, the change of the at least one security VLAN parameter being based at least on the indication that at least one network connectivity measure fails to meet at least one predefined threshold.

24. The method of claim 13, further comprising:

determining the first device is not listed in a preconfigured device list that indicates devices allowed to operate in the security VLAN; and in response to the determination that the first device is not listed in the preconfigured device list, adding the first device to the customer VLAN.

* * * * *